US012297979B2

(12) United States Patent
Rade et al.

(10) Patent No.: US 12,297,979 B2
(45) Date of Patent: May 13, 2025

(54) REPLACEABLE AND REVERSIBLE LIGHT ENGINE WITH POSITIVE LOCKING AND SAFETY STOPPER

(71) Applicant: Eaton Intelligent Power Limited, Dublin (IE)

(72) Inventors: Anzar Pandurang Rade, Pune (IN); Adarsh Mishra, Pune (IN); Christopher G. Henley, Pittsburg, PA (US); Virginia Marie Merriam, Clay, NY (US); Ryan Howard Karr, Syracuse, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 18/232,998

(22) Filed: Aug. 11, 2023

(65) Prior Publication Data

US 2024/0052994 A1 Feb. 15, 2024

(30) Foreign Application Priority Data

Aug. 12, 2022 (IN) ............................ 202211045986

(51) Int. Cl.
*F21V 15/01* (2006.01)
*F21V 17/00* (2006.01)
(Continued)

(52) U.S. Cl.
CPC ............ *F21V 15/01* (2013.01); *F21V 17/002* (2013.01); *F21V 17/107* (2013.01); *F21V 21/30* (2013.01);
(Continued)

(58) Field of Classification Search
CPC ....... F21V 21/30; F21V 17/002; F21V 17/107
See application file for complete search history.

(56) References Cited

U.S. PATENT DOCUMENTS 4,390,114 A * 6/1983 Sviatoslavsky ......... F21V 17/12
220/836
4,538,217 A * 8/1985 Ewing ..................... F21V 23/02
362/372

(Continued)

OTHER PUBLICATIONS

International Search Report and Written Opinion issued in International Application No. PCT/EP2023/025376, mailed Nov. 27, 2023, 8 pages.

*Primary Examiner* — William N Harris
(74) *Attorney, Agent, or Firm* — Talem IP Law, LLP

(57) ABSTRACT

A light engine for a floodlight includes a first subassembly for light emitting diodes (LEDs) and a second subassembly providing a housing for a driver. The first subassembly includes upper and lower mounting hinge arms at one side and the second subassembly includes upper and lower left hinge pins respectively extending from upper and lower left arms and upper and lower right hinge pins respectively extending from upper and lower right arms. The first subassembly can be mounted by the upper and lower mounting hinge arms on either side of the second subassembly, creating a reversible opening for access to the driver. The upper and lower mounting hinge arms can have a shape with respect to the hinge pins to provide a safety stopper. The lower mounting hinge arm can include a recess that catches against a lower arm to prevent automatically closing once in an open position.

16 Claims, 8 Drawing Sheets

(51) Int. Cl.
*F21V 17/10* (2006.01)
*F21V 21/30* (2006.01)
*F21V 23/00* (2015.01)
*F21Y 115/10* (2016.01)

(52) U.S. Cl.
CPC ......... *F21V 23/008* (2013.01); *F21Y 2115/10* (2016.08)

(56) References Cited

U.S. PATENT DOCUMENTS

| | | | |
|---|---|---|---|
| 8,950,907 B2 | 2/2015 | Packard et al. | |
| 9,945,540 B2 | 4/2018 | Zheng et al. | |
| 2014/0293612 A1 | 10/2014 | Tsao | |
| 2018/0031191 A1* | 2/2018 | Xiang | F21S 8/033 |
| 2022/0256986 A1* | 8/2022 | See | A44C 25/002 |

* cited by examiner

REPLACEABLE AND REVERSIBLE LIGHT ENGINE WITH POSITIVE LOCKING AND SAFETY STOPPER

BACKGROUND

Floodlights and other lighting fixtures can utilize light emitting diodes (LEDs) for improved light efficiency, energy efficiency, and lifespan. An LED floodlight can be embodied by a light engine, which is an integrated assembly of light emitting diodes (LEDs) and operational components (e.g., integrated driver, heat sink, etc.).

BRIEF SUMMARY

A replaceable and reversible light engine with positive locking and safety stopper for a floodlight is described. Through the provided safety stopper and positive locking feature, it is possible to improve safety and ease of servicing while achieving reversibility and replaceability of the light engine for a floodlight.

A light engine for a floodlight can include a first subassembly for light emitting diodes (LEDs) and a second subassembly providing a housing for a driver. The first subassembly includes an upper mounting hinge arm and a lower mounting hinge arm at one side of the outer housing and the second subassembly includes an upper left hinge pin extending from an upper left arm, a lower left hinge pin extending from a lower left arm, an upper right hinge pin extending from an upper right arm, and a lower right hinge pin extending from a lower right arm. The first subassembly can be mounted by the upper and lower mounting hinge arms at the one side on either side of the second subassembly, creating a reversible opening for access to the driver housed by the second subassembly.

To provide a safety stopper, the upper and lower mounting hinge arms can have oblong shape apertures that are at an offset angle with respect to a major axis of an oblong shaped head of a hinge pin of the second subassembly.

To provide a positive locking mechanism, the lower mounting hinge arm can include a lower recess on a downward facing surface that catches against a lower arm to prevent automatically closing once in an open position.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1A shows a left side perspective view; FIG. 1B shows a right side bottom perspective view; and FIGS. 1C and 1D show views of the floodlight in open configurations.

DETAILED DESCRIPTION

A replaceable and reversible light engine with positive locking and safety stopper for a floodlight is described. Through the provided safety stopper and positive locking feature, it is possible to improve safety and ease of servicing while achieving reversibility and replaceability of the light engine for a floodlight.

The replaceable and reversible light engine for the floodlight allows for field replacement and servicing. As described herein, the light engine for the floodlight includes two subassemblies—the first subassembly is for the LED portion and the second subassembly is for the driver portion (and other electronics such as internet of things (IoT) components, wires, sensor circuitry, etc.). The floodlight includes a front opening exposing the driver portion (and other electronics) for ease of installation and service of the light engine. The light engine has a reversible, symmetric design of hinge pins and corresponding hinges, allowing for complete reversibility such that the front opening can be opened from the left or right hand side, depending on how one attaches the LED subassembly to the driver housing subassembly.

Indeed, the front opening is reversible such that the hinges can be configured on the left or right side as desired—even in the field. The first subassembly (e.g., LED portion housing) includes hinges and the second subassembly (e.g., driver housing) includes hinge pins. In this manner, the light engine can be hinged at one end and supported by latches at the other end.

A safety stopper and a positive locking feature provide safety and ease of servicing while achieving the reversibility and replaceability of the light engine.

Figure 1B:
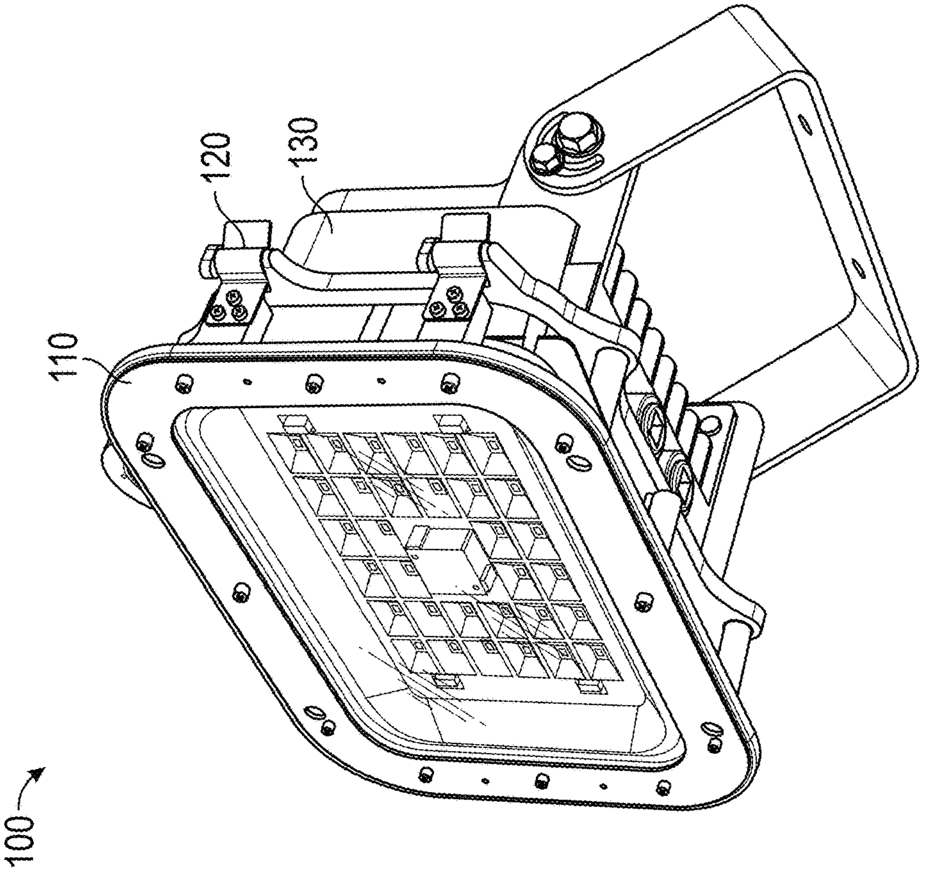
FIGS. 1A-1D illustrate views of a floodlight incorporating a replaceable and reversible light engine.
Figure 1A:
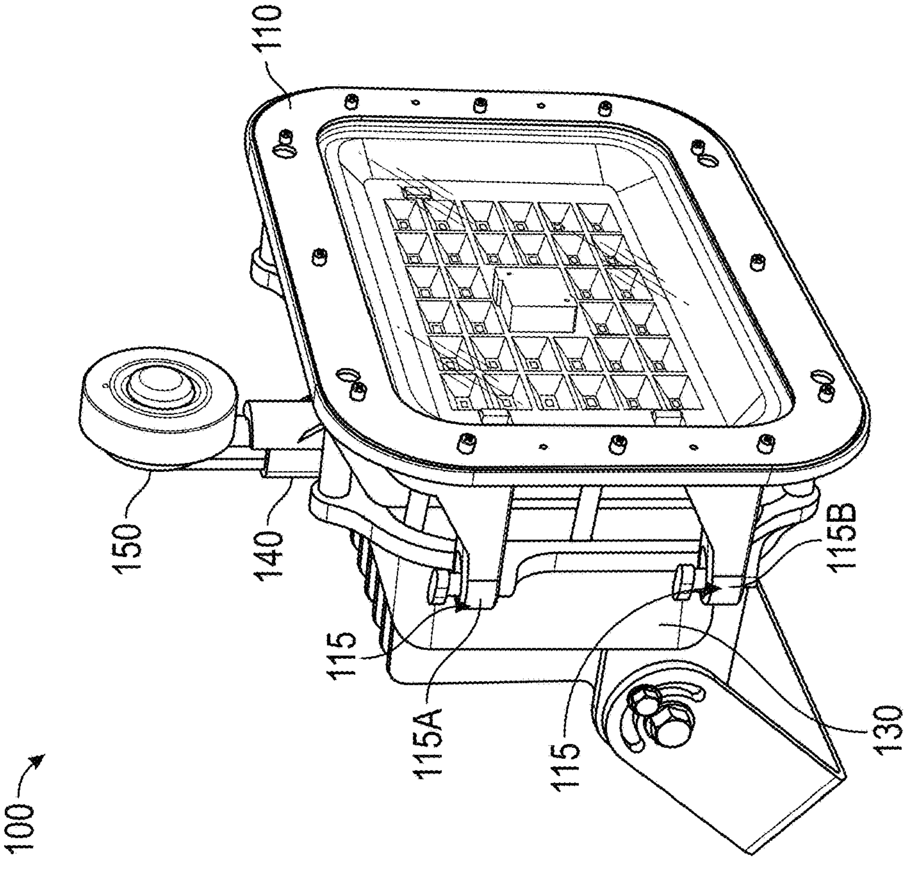
Figure 1C:
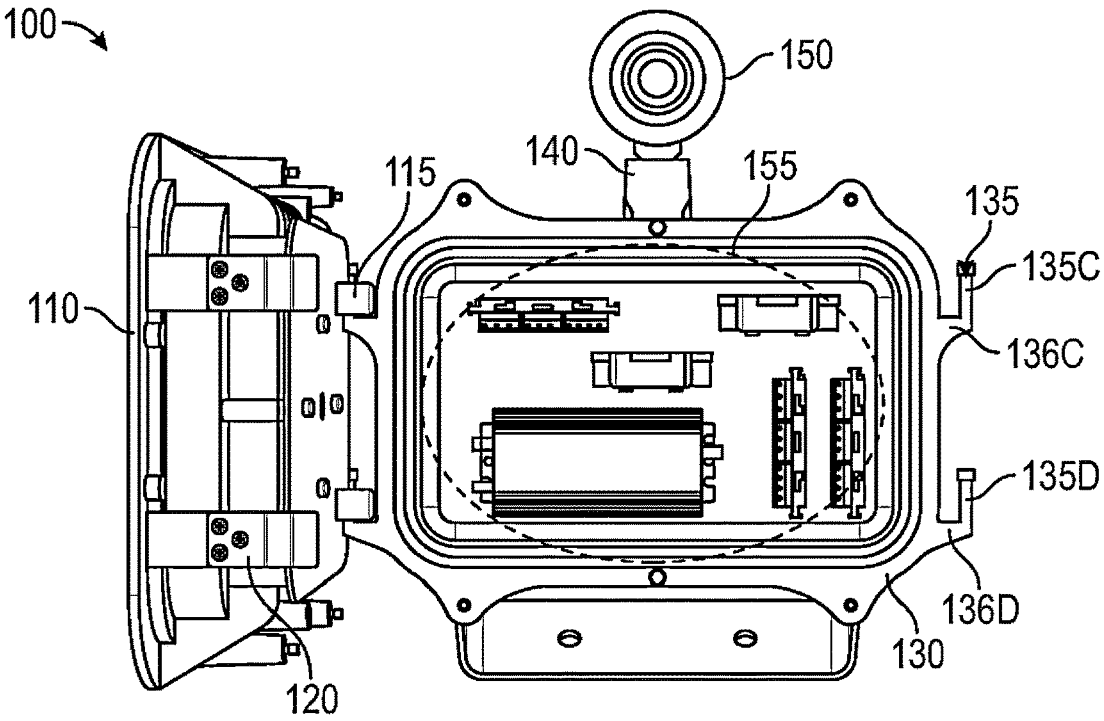
Figure 1D:
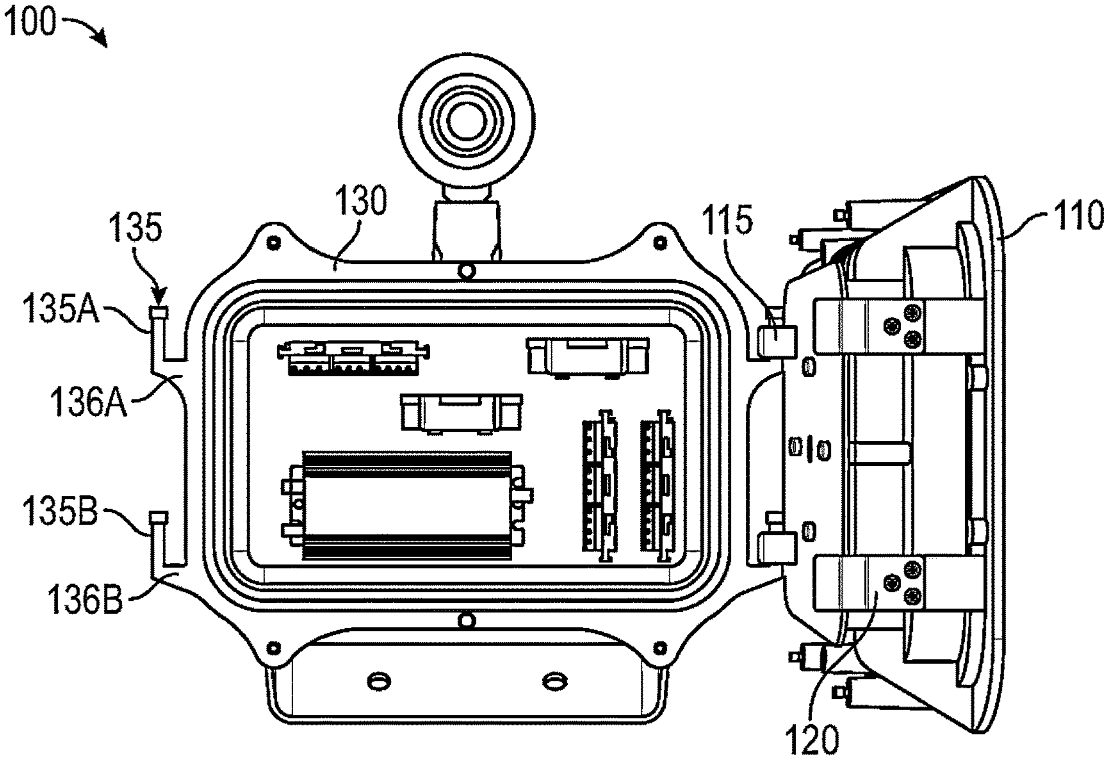

FIGS. 1A-1D illustrate views of a floodlight incorporating a replaceable and reversible light engine. FIG. 1A shows a left side perspective view; FIG. 1B shows a right side bottom perspective view; and FIGS. 1C and 1D show views of the floodlight in open configurations. A floodlight 100 includes a first subassembly 110 with hinges 115 and latches 120 and a second subassembly 130 with hinge pins 135. Hinges 115 include an upper mounting hinge arm 115A and a lower mounting hinge arm 115B at one side of the first subassembly 110.

In the configuration shown in FIGS. 1A-1C, the floodlight 100 has the first subassembly 110 positioned such that the hinges 115 are at the left side (see FIGS. 1A and 1C) and latches 120 are at the right side (see FIGS. 1B and 1C). An aperture 140 is provided in the second subassembly 130 to enable external sensors (e.g., sensor 150) to be coupled to circuitry 155 within the housing of the second subassembly 130. In the configuration shown in FIG. 1D, the light engine is reversed such that the hinges 115 of the first subassembly 110 are at the right side and the latches 120 are at the left side of the second subassembly 130.

As mentioned above, the floodlight 100 has a replaceable and reversible light engine by providing symmetrical hinge pins 135 on the second subassembly 130 such that hinges 115 of a first subassembly 110 can be removed and attached or reattached to the left or the right side of the second subassembly 130 as desired. As can be seen in FIGS. 1C and 1D, the second subassembly 130 has hinge pins 135 including an upper left hinge pin 135A extending from an upper left arm 136A, a lower left hinge pin 135B extending from a lower left arm 136B, an upper right hinge pin 135C extending from an upper right arm 136C, and a lower right hinge pin 135D extending from a lower right arm 136D.

A first feature is provided on the hinge pin that acts as a stopper/safety stopper to avoid accidental removal of the LED subassembly (e.g., the first subassembly) during operation or assembly. The stopper is designed in such a way that the LED subassembly can only be removed after opening it to a certain specified angle.

Figure 2:
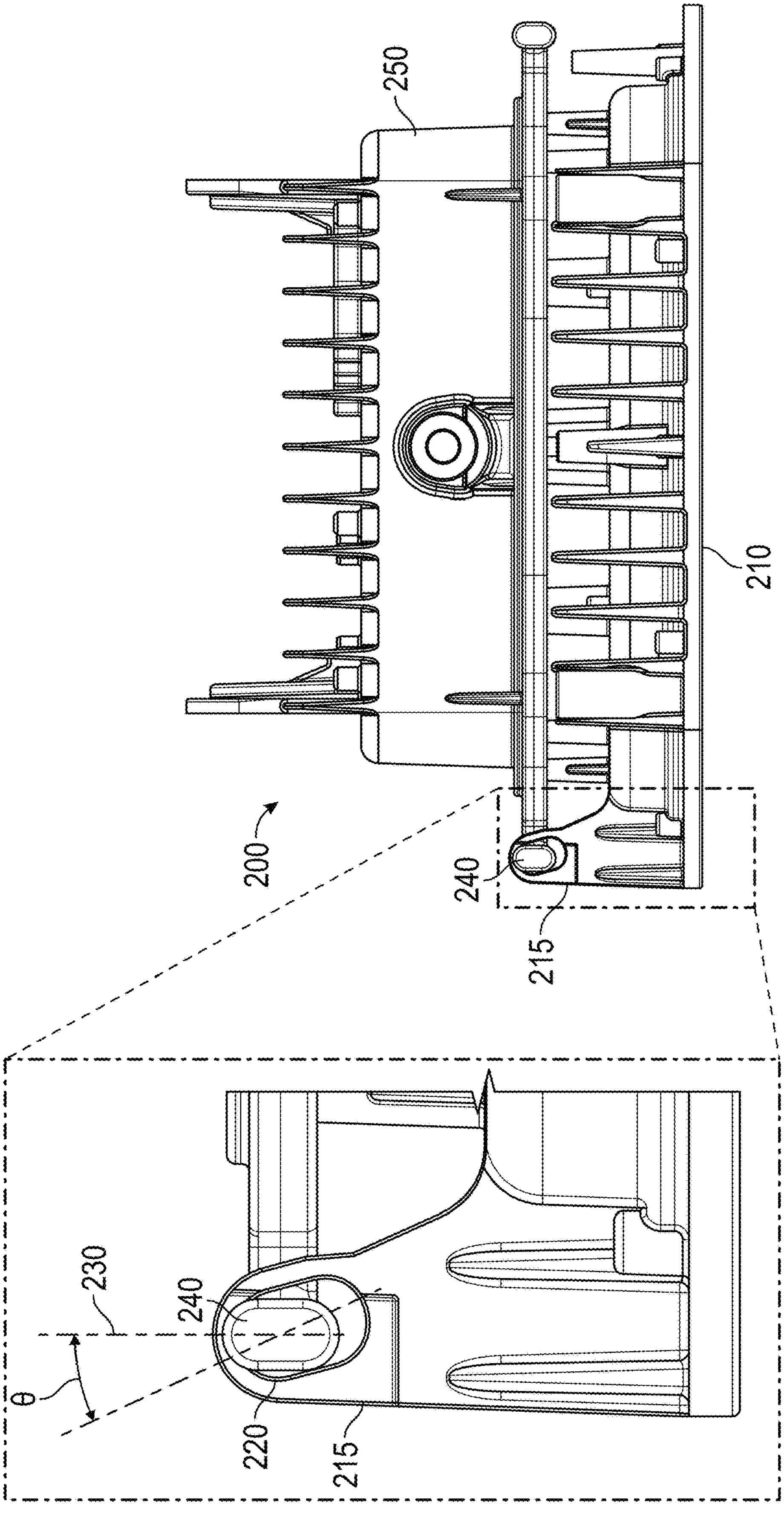
FIG. 2 illustrates a safety stopper feature of a floodlight incorporating a replaceable and reversible light engine.

FIG. 2 illustrates a safety stopper feature of a floodlight incorporating a replaceable and reversible light engine. Referring to FIG. 2, to provide a safety stopper, a mounting hinge arm 215 of a first subassembly 210 (e.g., LED subassembly) of a light engine 200 has an oblong shape aperture 220 that is at an offset angle θ with respect to a major axis 230 of an oblong shaped head 240 of a hinge pin of a second subassembly 250 of the light engine 200. Light engine 200 can be configured as described with respect to floodlight 100 of FIGS. 1A-1D. "Oblong" refers to an elongated shape that includes oval, rectangle, and rounded rectangle.

In some cases, each hinge pin of second subassembly 250 (e.g., upper left hinge pin, the lower left hinge pin, the upper right hinge pin, and the lower right hinge pin) have an oblong shaped head 240. In addition, the pin bodies of the hinge pins of second subassembly 250 can have a first diameter smaller than a diameter of a major axis 230 of the oblong shaped head 240.

Figure 3A:
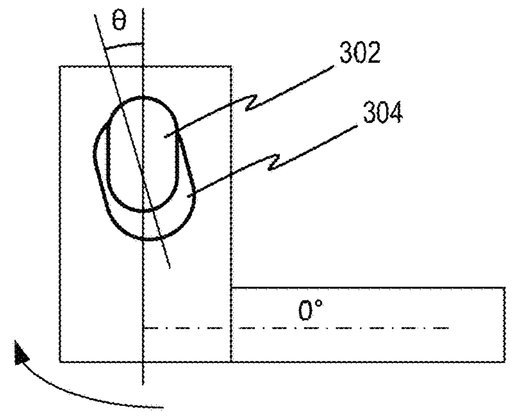
FIGS. 3A-3D illustrate operation of the safety stopper feature.
Figure 3B:
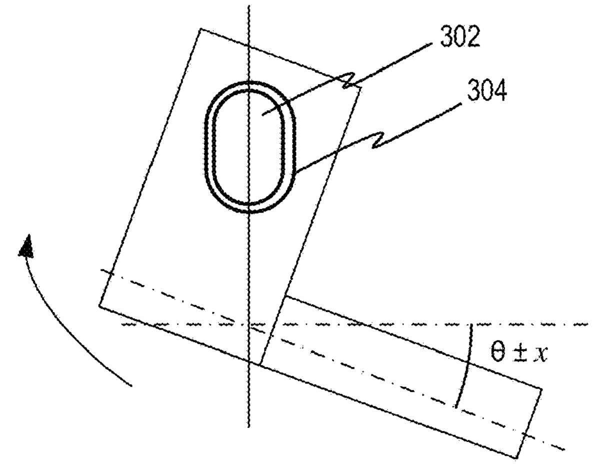

FIGS. 3A-3D illustrate operation of the safety stopper feature. Referring to FIG. 3A, in a closed position (where the light engine is considered to have an opening of 0°), as also shown in FIG. 2, the oblong shaped head 302 of a hinge pin is inhibited from falling through the oblong shape aperture 304 of the mounting hinge arm due to the offset angle (e.g., θ). Referring to FIG. 3B, as the first subassembly hinges open from the second subassembly, there are a range of angles that the oblong shape aperture 304 rotates through that allow for the oblong shaped head 302 of the hinge pin to fall or be pulled through (e.g., range of angles θ±x, where θ is the offset angle and x is a tolerance amount of degrees, for example providing a range of 2 to 10 degrees where the head and aperture align sufficiently for removal of the first subassembly).

Figure 3C:
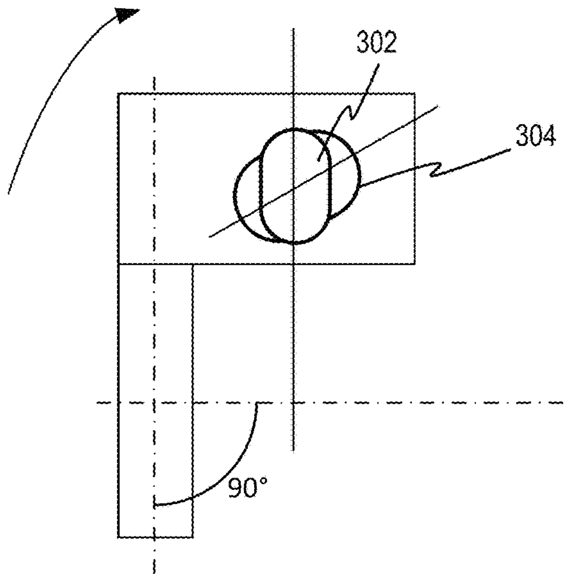
Figure 3D:
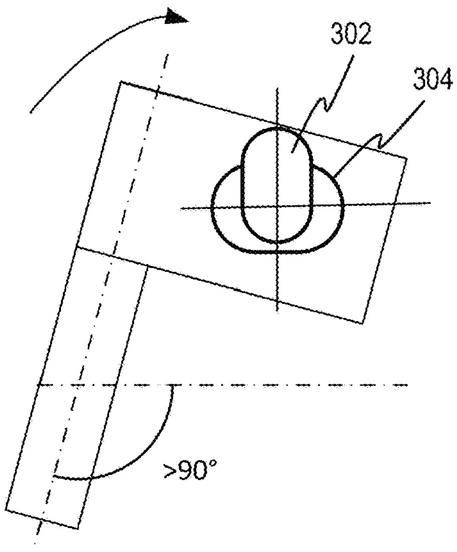

As the light engine continues to open to expose the components in the second assembly beyond the range of angles that permit removal of the first subassembly, the oblong shaped head 302 of the hinge pin is inhibited from falling through the oblong shape aperture 304 of the mounting hinge arm. As seen in FIGS. 3C and 3D, open positions of the first subassembly that are used to service components in the second subassembly such as 90° and greater than 90° result in continued misalignment between the oblong shape aperture 304 of the mounting hinge arm and the oblong shaped head 302 of the hinge pin, preventing accidental removal of the first subassembly.

Accordingly, the offset angle for the oblong shape aperture 220/304 is configured such that the major axis 230 of the oblong shape aperture aligns with the oblong shaped head 240/302 of the corresponding hinge pin when the first subassembly is in a first open position with respect to the second subassembly that is at an angle within a first range of angles less than 90 degrees. In some cases, the first range of angles is between 20 and 30 degrees.

Figure 4A:
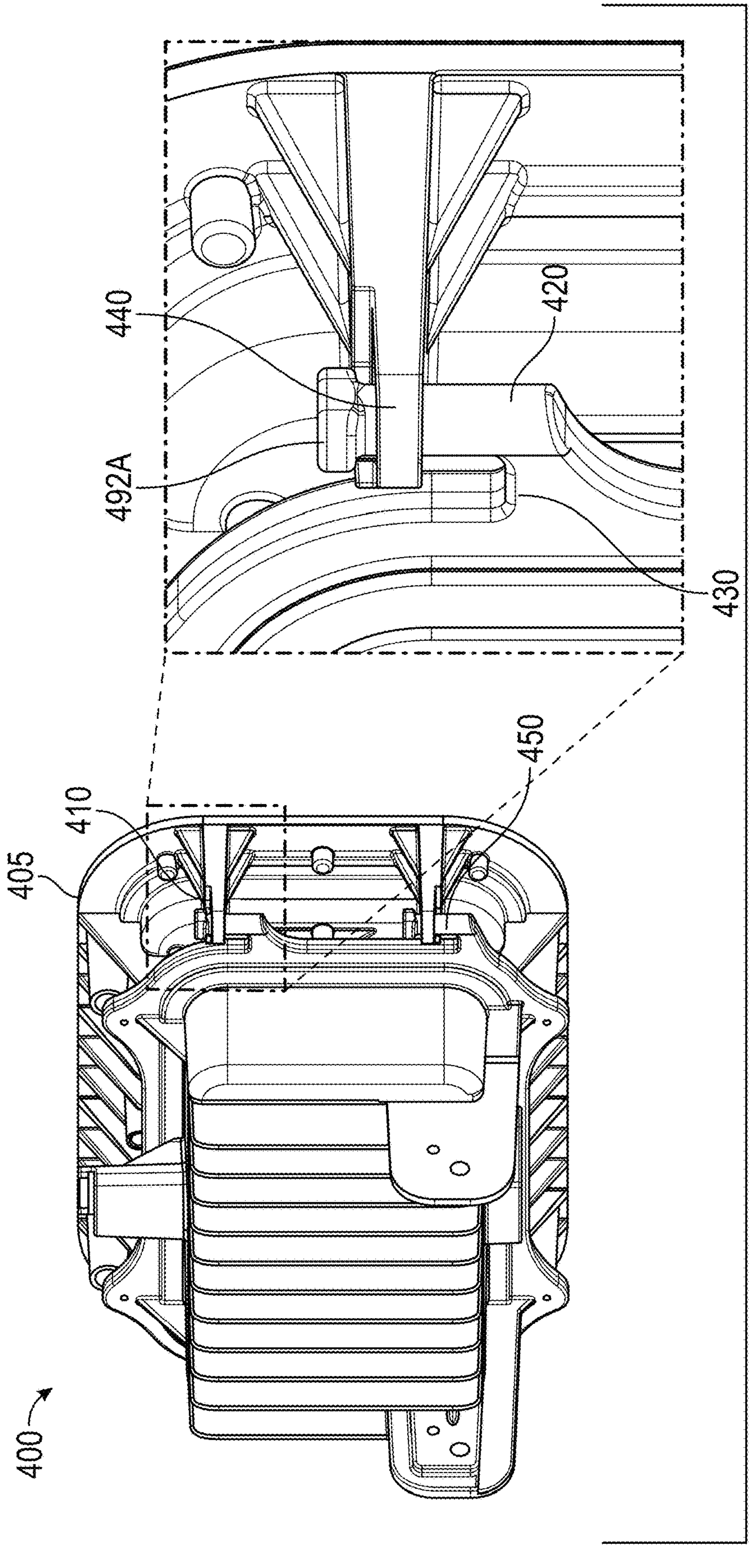
FIGS. 4A-4C illustrate closed and open positions of a floodlight with a safety stopper feature.
Figure 4B:
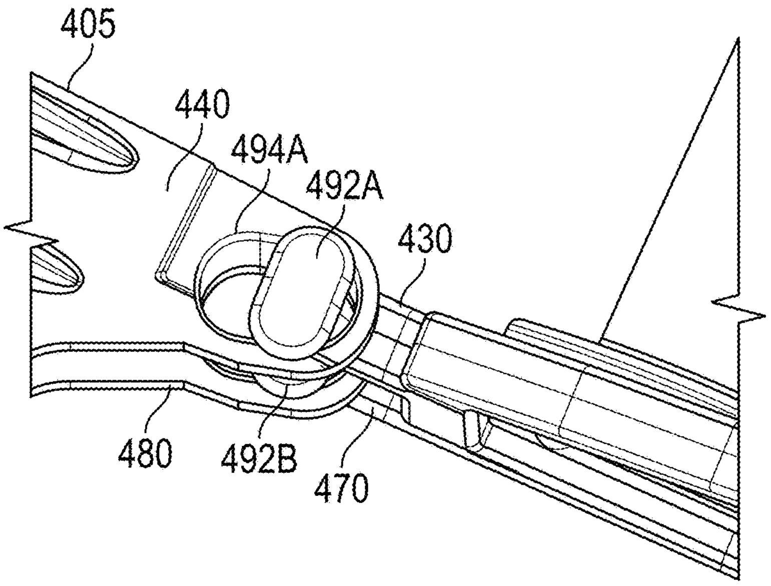
Figure 4C:
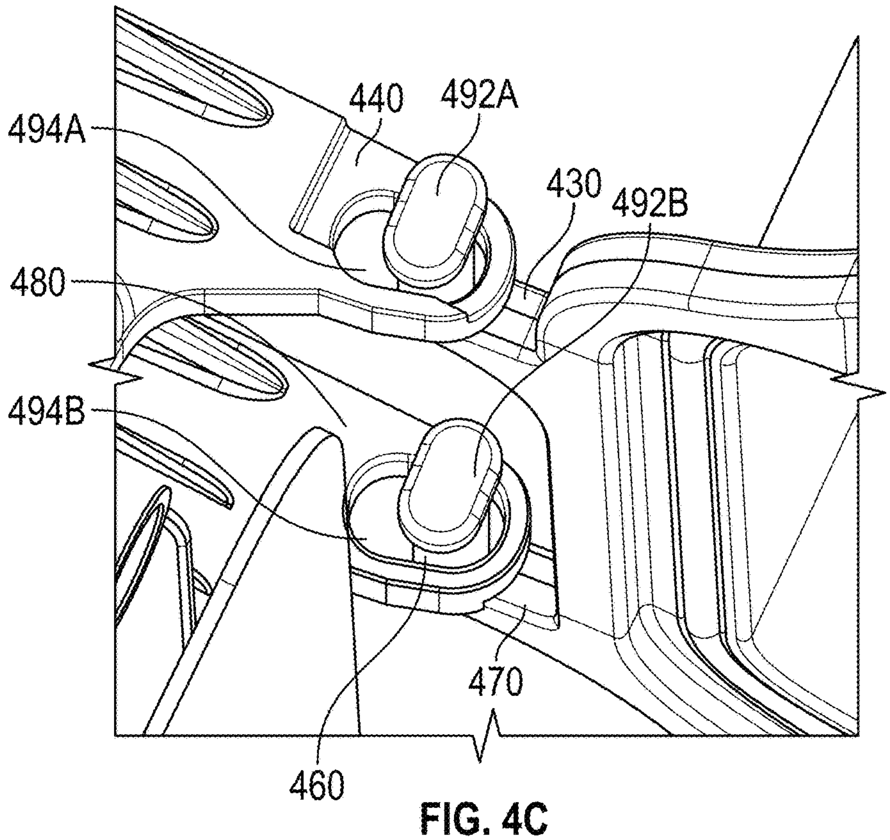

FIGS. 4A-4C illustrate closed and open positions of a floodlight with a safety stopper feature. FIG. 4A shows a back, left side perspective view of a floodlight 400, configured as described with respect to floodlight 100 of FIGS. 1A-1C, and an expanded view of the upper left hinge 410 formed by the upper left hinge pin 420 that extends from the upper left arm 430 and the upper mounting hinge arm 440. FIG. 4B shows a top view (with some perspective) of the expanded view of the upper left hinge 410 while the first subassembly 405 is in an open position; and FIG. 4C shows additional perspective of the top view of FIG. 4B in which the lower left hinge 450, which is formed by the lower left hinge pin 460 that extends from the lower left arm 470 and the lower mounting hinge arm 480, can be seen.

Referring to FIGS. 4B and 4C, it can be seen that the oblong shaped head 492A, 492B of the hinge pin 420, 460 is misaligned with the oblong shape aperture 494A, 494B of the mounting hinge arm 440, 480, which prevents the accidental removal of the first subassembly 405 when the floodlight 400 is in an open position such as for servicing (see also FIGS. 3C and 3D).

A second feature is provided on the hinge to act as a positive locking mechanism. The positive locking mechanism helps in locking the LED subassembly at its place during servicing or maintenance. When the LED subassembly is opened for servicing/maintenance, after opening the front opening to greater than 90 degrees, the positive locking feature comes into action and prevents the LED subassembly from closing beyond the lock until/unless the LED subassembly is lifted to allow for bypassing of the positive locking mechanism. This makes servicing/maintenance easier as the front opening is prevented from closing and does not need to be manually propped open.

Figure 5A:
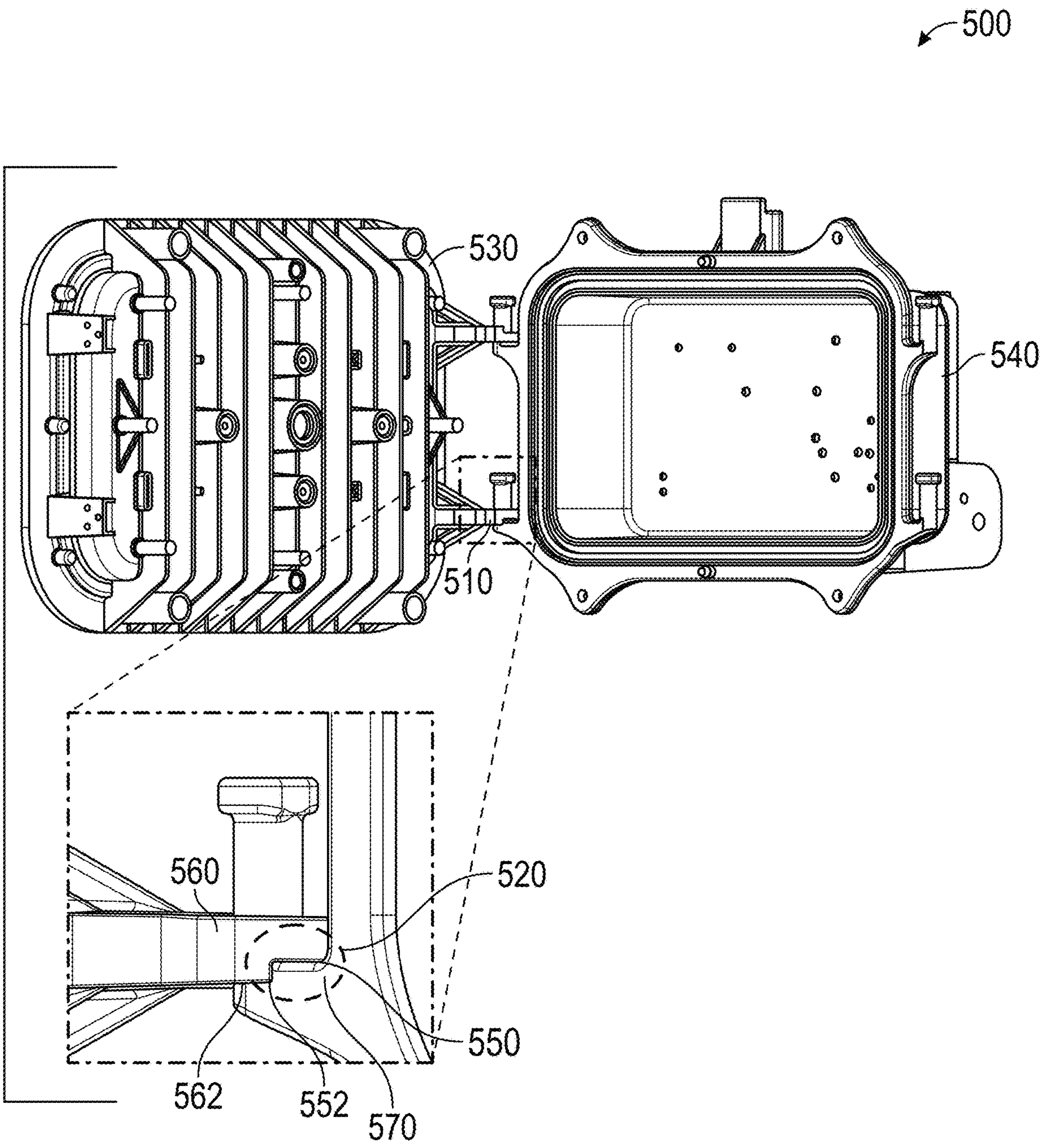
FIGS. 5A-5C illustrate a positive locking mechanism of a floodlight incorporating a replaceable and reversible light engine.
Figure 5B:
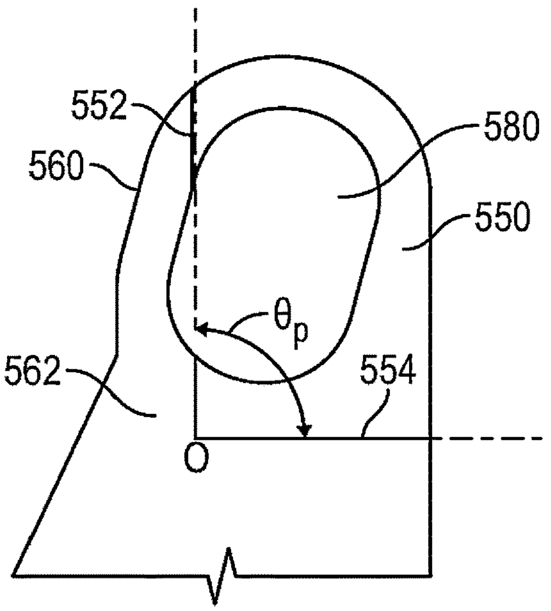
Figure 5C:
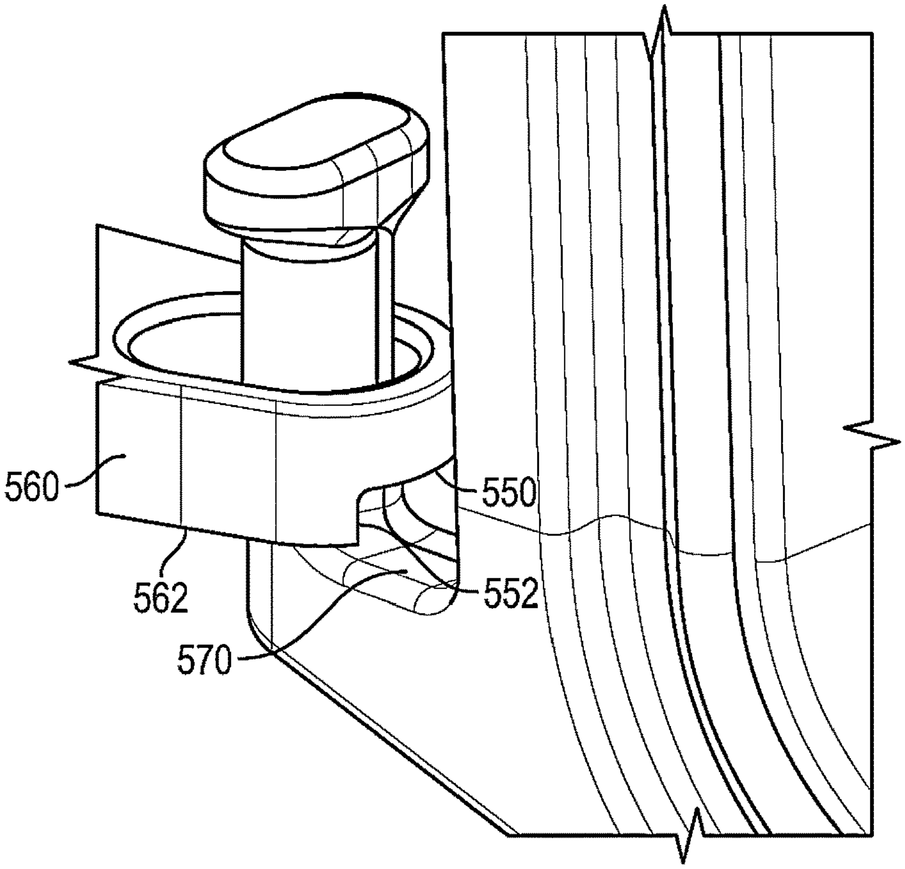

FIGS. 5A-5C illustrate a positive locking mechanism of a floodlight incorporating a replaceable and reversible light engine. To provide a positive locking mechanism, the lower mounting hinge arm includes a lower recess on a downward facing surface that catches against a lower arm to prevent automatically closing once in an open position. FIG. 5A shows a front left side perspective view of a floodlight 500 in an open position and an expanded view of the lower hinge 510. Referring to FIG. 5A, operation of the positive locking mechanism 520 occurs when the floodlight 500 is in an open position of the first subassembly 530 with respect to the second subassembly 540 of at least 90 degrees. Floodlight 500 can be configured as described with respect to FIGS. 1A-1C.

Referring to FIGS. 5A and 5B, positive locking mechanism 520 is provided by a lower recess 550 on a downward facing surface 562 of the lower mounting hinge arm 560 that catches on the lower arm (e.g., lower left arm 570). The lower recess 550 has a starting boundary 552 along a first axis extending from a lower hinge origin (O) and passing through the aperture 580 of the lower mounting hinge arm 560 and an ending boundary 554 along a second axis extending from the lower hinge origin (O), where the second axis is a radial distance ($\theta_p$) from the first axis. The radial distance can be, for example, 90 degrees, but can vary depending on desired positive locking position of the first subassembly 530 with respect to the second subassembly 540, desired opening range of the first subassembly 530 with respect to the second subassembly 540, and ability of the recess to catch on to the lower arm for opening and/or closing among other aspects. In some cases, the starting boundary 552 and the ending boundary 554 are positioned such that the first subassembly opens 530 to at least 180 degrees while one of the lower left arm or the lower right arm of the second subassembly 540 is within the lower recess 550.

FIG. 5C shows a state where the positive locking mechanism is not engaged, for example when the first subassembly is hinging outward from the closed position before opening wide enough to drop down onto the lower arm due to the lower recess 550 or when the first subassembly is hinging inward from the open position after a user lifts to disengage the positive locking mechanism. Referring to FIG. 5C, the downward facing surface 562 of the lower mounting hinge arm 560 outside of the starting boundary 552 of the lower recess 550 contacts the lower arm 570.

Since the light engine is reversible (e.g., the first subassembly can be connected to open from the right or the left), both the lower mounting hinge arm and the upper mounting hinge arm include recesses. The recess in the upper mounting hinge arm can be seen in FIGS. 2 and 4A-4C, but this recess faces upward unless the first subassembly is rotated, causing the upper mounting hinge arm to be considered the lower mounting hinge arm.

It should be understood that when a value is provided, such as a number of degrees of an angle, there is flexibility to the exact number (e.g., significant figures/digits) in view of acceptable manufacturing tolerances as well as values sufficient for achieving the same desired result. For example, 90 degrees can encompass 90 degrees plus or minus acceptable tolerance (e.g., 1%-5%).

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A light engine for a floodlight comprising:

a first subassembly comprising light emitting diodes (LEDs) of a light engine, wherein the first subassembly comprises an upper mounting hinge arm and a lower mounting hinge arm at one side of the first subassembly; and a second subassembly comprising a housing for a driver of the light engine, wherein the second subassembly comprises an upper left hinge pin extending from an upper left arm, a lower left hinge pin extending from a lower left arm, an upper right hinge pin extending from an upper right arm, and a lower right hinge pin extending from a lower right arm;

wherein the first subassembly attaches to the second subassembly to form a left hinge by coupling between the upper mounting hinge arm and the lower mounting hinge arm and the upper left hinge pin and the lower left hinge pin, and reversibly attaches to the second subassembly to form a right hinge by coupling between the upper mounting hinge arm and the lower mounting hinge arm and the upper right hinge pin and the lower right hinge pin.

2. The light engine of claim 1, wherein the upper mounting hinge arm and the lower mounting hinge arm each comprises an oblong shape aperture that is at an offset angle with respect to a major axis of an oblong shaped head of a corresponding hinge pin of the second subassembly.

3. The light engine of claim 2, wherein the offset angle for the oblong shape aperture is configured such that the major axis of the oblong shape aperture aligns with the oblong shaped head of the corresponding hinge pin when the first subassembly is in a first open position with respect to the second subassembly that is at an angle within a first range of angles less than 90 degrees.

4. The light engine of claim 3, wherein the first range of angles less than 90 degrees is between 20 and 30 degrees.

5. The light engine of claim 2, further comprising a positive locking mechanism formed by a lower recess on a downward facing surface of the lower mounting hinge arm that catches against a lower arm of either the lower left arm or the lower right arm.

6. The light engine of claim 5, wherein the lower recess has a starting boundary along a first axis extending from a lower hinge origin and passing through the oblong shape aperture of the lower mounting hinge arm and an ending boundary along a second axis extending from the lower hinge origin, the second axis being a radial distance from the first axis.

7. The light engine of claim 6, wherein the radial distance of the second axis from the first axis is 90 degrees.

8. The light engine of claim 6, wherein the starting boundary and the ending boundary are positioned such that the first subassembly opens to at least 180 degrees while one of the lower left arm or the lower right arm of the second subassembly is within the lower recess.

9. The light engine of claim 6, wherein the upper mounting hinge arm has an upper recess on an upward facing surface, the upper recess having a corresponding starting boundary along a corresponding first axis extending from an upper hinge origin and passing through the oblong shape aperture of the upper mounting hinge arm and a corresponding ending boundary along a corresponding second axis extending from the upper hinge origin, the corresponding second axis being the radial distance from the corresponding first axis.

10. The light engine of claim 5, wherein the positive locking mechanism prevents the first subassembly from closing beyond a second open position until the first subassembly is lifted to allow the lower left arm out of the lower recess.

11. The light engine of claim 10, wherein the second open position of the first subassembly with respect to the second subassembly is at an angle of greater than or equal to 90 degrees.

12. The light engine of claim 1, further comprising a positive locking mechanism formed by a lower recess on a downward facing surface of the lower mounting hinge arm that catches against a lower arm of either the lower left arm or the lower right arm.

13. The light engine of claim 12, wherein the positive locking mechanism prevents the first subassembly from closing beyond a second open position until the first subassembly is lifted to allow the lower left arm out of the lower recess.

14. The light engine of claim 13, wherein the second open position of the first subassembly with respect to the second subassembly is at an angle of greater than or equal to 90 degrees.

15. The light engine of claim 1, wherein the first subassembly further comprises an upper latch and a lower latch at another side of the first subassembly from the upper mounting hinge arm and the lower mounting hinge arm.

16. The light engine of claim 1, wherein the upper left hinge pin, the lower left hinge pin, the upper right hinge pin, and the lower right hinge pin each comprises an oblong shaped head and a pin body having a first diameter smaller than a diameter of a major axis of the oblong shaped head.

* * * * *